United States Patent
Bol et al.

[15] 3,695,765
[45] Oct. 3, 1972

[54] METHOD FOR MEASURING AND/OR MONITORING THE SIZE OF PARTICLES IN SUSPENSION

[72] Inventors: Jan Paul Bol, Kelkheim; Joseph Gebhart, Frankfurt, Main; Günther Seger, Kelkheim, all of Germany

[73] Assignee: Laporte Industries Limited, London, England

[22] Filed: April 22, 1970

[21] Appl. No.: 30,783

[30] Foreign Application Priority Data

April 25, 1969 Germany..........P 19 21 149.5

[52] U.S. Cl. ..............................................356/102
[51] Int. Cl. ...........................................G01n 15/02
[58] Field of Search..............356/208, 246, 102–104; 350/179

[56] References Cited

UNITED STATES PATENTS 3,446,558  5/1969  Seaton........................356/104
3,529,896  9/1970  Padawer......................356/246
3,540,826  11/1970  Bisberg.......................356/102

*Primary Examiner*—Ronald L. Wibert
*Assistant Examiner*—Conrad Clark
*Attorney*—Hall and Houghton

[57] ABSTRACT

A method for measuring the diameter of particles in a suspension wherein a particle-free layer having substantially the same refractive index as the suspending medium is provided directly above the suspension and the upper surface of the suspension is illuminated at a large angle of incidence by a beam of radiation passing through the particle-free layer and the intensity of radiation that is scattered by the suspended particles and then re-enters the layer is measured for one or more small scattering angles. These measurements of scattered radiation provide a measure of the mean particle diameter of the suspended particles that is substantially independent of the concentration of particles in the suspension.

7 Claims, 2 Drawing Figures

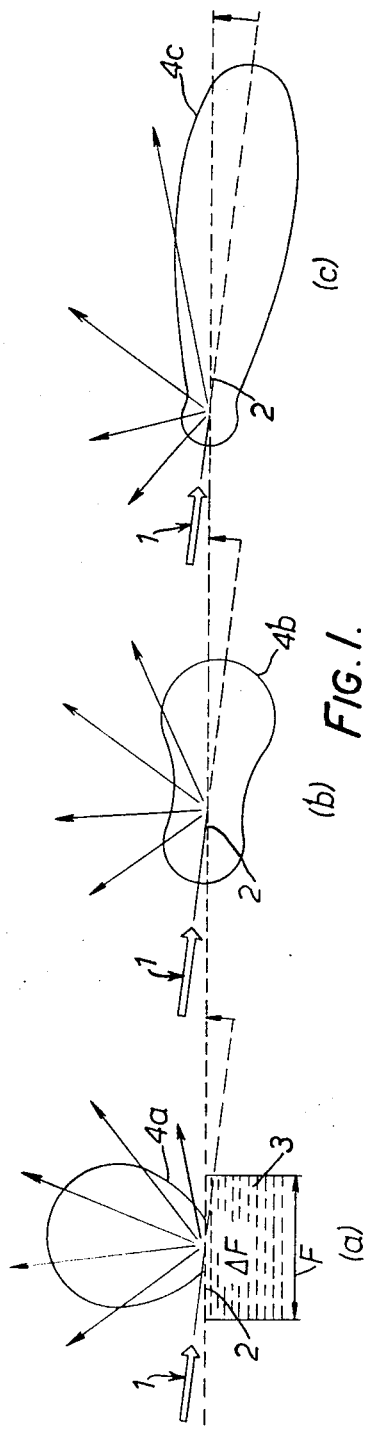
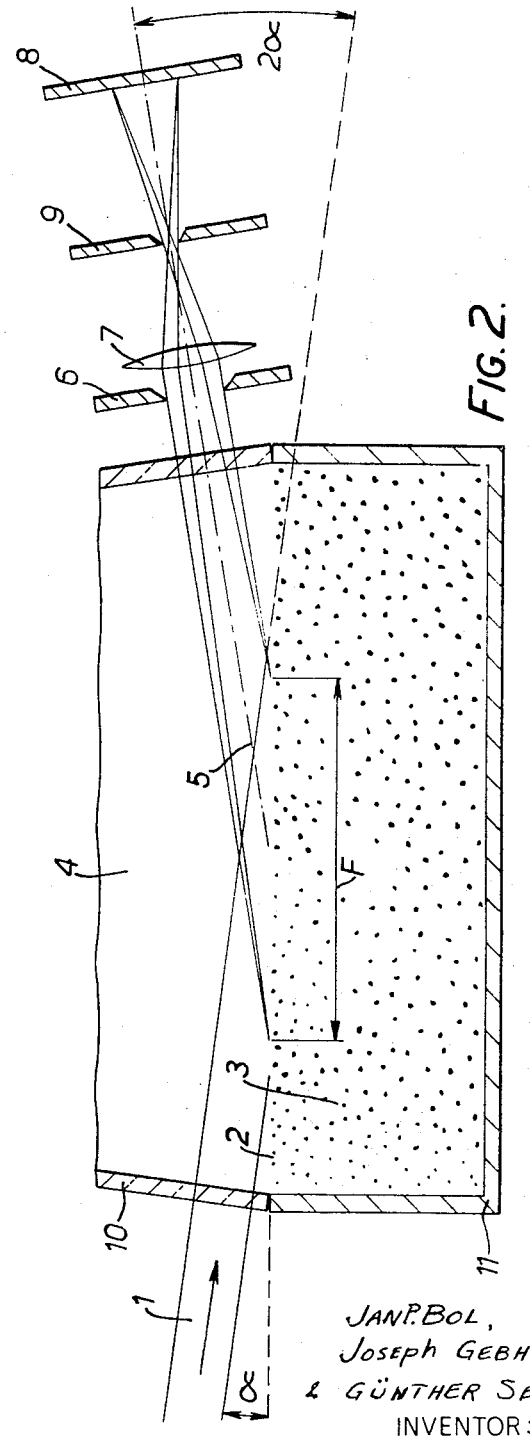

METHOD FOR MEASURING AND/OR MONITORING THE SIZE OF PARTICLES IN SUSPENSION

This invention relates to a technique for measuring, and/or detecting changes in, the diameter of suspended particles, using measurements of the intensity of electromagnetic radiation scattered by the particles.

When electromagnetic radiation, for example visible light, is incident on a suspension, the resulting scattered radiation consists, in general, of two principal components, that is to say, a diffuse background radiation arising from multiple scattering, and a component consisting of radiation that has undergone single scattering only. It is the singly scattered radiation that carries information as to the diameter of the suspended particles and, in order to measure particle diameter reliably using a light-scattering technique, the diffuse background must be either eliminated or separated in some way from the information-bearing singly scattered radiation.

When the concentration of particles in suspension is sufficiently low for the mean free path of radiation in the suspension to be large relative to the total path length, the multiple or secondary scattering can be neglected to a first approximation. It has previously been proposed to measure the diameter of suspended particles by diluting the suspension to such an extent that the multiple scattering can be neglected, and measuring the intensity of light scattered by the dilute suspension so obtained. The scattered light intensity then depends both on the particle diameter and, in accordance with Beer's Law, on the particle concentration, so that it is necessary to ascertain the particle concentration before the particle diameter can be evaluated.

When the particle concentration is such that the mean free path is not large in relation to the total path length of radiation in the suspension, multiple scattering can no longer simply be neglected.

The present invention provides a method for measuring, and /or detecting changes in, the diameter of particles in suspension using measurements of the intensity of radiation scattered by the suspended particles, wherein there is provided, directly above the suspension, a particle-free layer of a material having substantially the same refractive index as the suspending medium, the upper surface of the suspension is illuminated at a large angle of incidence, that is to say, towards grazing incidence, by radiation passing through the layer, and the intensity of radiation that is scattered by the suspended particles and re-enters the layer is measured for one or more small forward scattering angles.

Measurements of the intensity of scattered radiation made in accordance with the invention provide a measure of the mean particle diameter of the suspended particles that is substantially independent of the concentration of particles in the suspension. Further, useful measurements can be obtained on suspensions of relatively high volume concentrations, in which the mean free path of the radiation in the suspension is small relative to the total path length, without its being necessary to carry out an initial dilution step. Thus, for example, the particle diameter of pigmentary titanium dioxide can be measured in suspensions having volume concentrations up to about 7 percent or even more in some cases.

The minimum usable particle concentration depends on the geometry of the system and, in particular, on the depth of the suspension, the requirement being that the depth must be sufficiently great that, for a given particle concentration, substantially none of the radiation reaches the boundaries of the suspension, the requirement being that the depth must be sufficiently great that, for a given particle concentration, substantially none of the radiation reaches the boundaries of the suspension other than the upper surface thereof. The maximum concentration is determined by the requirement that the mean penetration of the radiation into the suspension must be large in relation to the mean particle radius.

Advantageously, the arrangement is such that the angle of incidence of the illuminating radiation is equal to the angle between the measured scattered beam and the normal. In such a symmetrical arrangement, the scattering angle is equal to twice the complement of the angle of incidence.

The optimum angle of incidence for any particular application will depend on the mean diameter of the suspended particles. For most purposes, an angle of at least 65° will be required and, in many cases, the optimum angle will be at least 80°.

Advantageously, the illuminating radiation enters the layer through a surface thereof that is not parallel to the upper surface of the suspension. Preferably, the said surface is substantially perpendicular to the illuminating beam.

A method in accordance with the invention and an arrangement suitable for carrying out the method will now be described, by way of example, with reference to the accompanying drawings, in which:

FIG. 1a illustrates diagrammatically the multiple (Lambert) scattering;

FIGS. 1b and 1c illustrate diagrammatically the effect of increasing particle diameter on the intensity of radiation scattered forward in the small region; and FIG. 2 shows a diagrammatic section of the arrangement.

Referring first to FIG. 1 of the accompanying drawings, a beam of radiation, for example, visible light, indicated generally by the reference numeral 1, impinges at a large angle of incidence on the upper surface 2 of a suspension 3 and illuminates an area F. The suspension 3 is surmounted by a particle-free layer composed of a material having the same refractive index as the suspending medium.

Referring to FIG. 1a, the intensity of the diffuse background scattering is represented by an envelop 4a, which is a polar diagram. As can be seen from FIG. 1a, the angular distribution of the diffuse background scattering approximately follows Lambert's Cosine Law, according to which the intensity of scattered radiation emerging from a surface element F is least for small scattering angles.

The intensity of the singly scattered radiation increases as the ratio of the refractive index of the particles to the refractive index of the suspending medium increases. Further, in the case of very small particles, the intensity of the singly scattered radiation is very weak. With typical values of the refractive indices, this situation occurs for particles having a radius of below about 0.2 $\lambda_{med.}$ (where $\lambda_{med.}$ is the wavelength of the incident radiation in the suspending medium).

As the particle size increases, the intensity of the singly scattered radiation increases progressively as shown in FIGS. 1b and 1c, in which the lobes 4b and 4c, respectively, are polar diagrams. In general this concentration of the singly scattered radiation into the forward small angle region (which is known as the Mie effect), becomes apparent for particles having a radium greater than about $0.3\lambda_{med.}$, and is especially marked for particles having the size of the wavelength and above, that is to say, for particles having a radius greater than $\lambda_{med.}$. In the case of particles having radii of more than about $5\lambda_{med.}$, it is possible, and often more convenient, to measure particle size by diffraction methods, and the method of the invention may then offer little or no advantage.

For particles having radii in the range of from $0.3\lambda_{med.}$ to $5\lambda_{med.}$, the intensity measurements obtained by the method of the invention represent the singly scattered radiation only; in other words, there is a reliable separation between the diffuse background radiation and the information-bearing component.

The wavelength of the incident radiation in the suspending medium, $\lambda_{med.}$, depends on its wavelength in vacuo, $\lambda_{vac.}$, and on the refractive index $\mu$ of the medium:

$$\lambda med = \lambda vac/\mu$$

Consequently, by suitable choice of incident wavelength, the range of particle diameters for which the method of the invention is applicable can be extended. Although $\lambda_{med.}$ can also be varied by choice of the suspending medium, it is not in general possible to lower the minimum measurable particle radius by selecting a suspending medium having a high refractive index because the reduction in $\lambda_{med.}$ is more than offset by the decrease in the aforesaid ratio of refractive indices.

The method of the invention is not confined to visible radiation. Thus, in the case of small particles, wavelengths shorter than visible light may be used and, conversely, longer wavelength radiation may be used for relatively large particles.

In general, the maximum satisfactory scattering angle depends on the particle diameter. For example, for particles having a diameter of 1 micron, the scattering angle may be as high as about 23°, while for particles having a diameter of 2 microns, the scattering angle may be as high as about 11° For an aqueous suspension of pigmentary titanium dioxide, a scattering angle as high as 50° may be used.

The provision in accordance with the invention of a particle-free layer of material having the same refractive index as the suspending medium enables the incident light to penetrate the surface of the suspension without being reflected. If reflection were to be allowed to occur at that surface, then the reflected beam would completely mask the relatively weak scattered beam, rendering it inaccessible to measurement.

The particle-free layer may be a liquid (preferably the same liquid as the suspending medium) or it may be a solid block having a plane lower face. When the particle-free layer is a liquid, a transparent interfacial membrane should be provided between the particle-free layer and the suspension, in order to maintain the upper surface of the suspension uniformly smooth and free from ripples. When the particle-free layer is solid, the plane lower face of the block causes the surface to adopt the desired smooth characteristics.

Advantageously, the upper surface of the suspension is illuminated with a collimated monochromatic beam of light, and the intensity of the scattered light is measured at a single small scattering angle. The intensity value obtained in this way provides a measure of the mean diameter of the suspended particles.

Some information as to the size distribution of the particles in suspension may be ascertained by illuminating the upper surface of the suspension with a collimated monochromatic light beam, and measuring the scattered light intensity as a function of the scattering angle within a range of small scattering angles.

Alternatively, information as to the particle size distribution may be ascertained by illuminating the upper surface of the suspension with a collimated beam of polychromatic light, and measuring the intensity of the scattered light as a function of wavelength at a single small scattering angle.

By recording continuously the intensity value at a fixed scattering angle from incident light of a fixed spectral composition, the method of the invention may be used for continuously monitoring the mean particle size of the suspended particles.

Measurement of particle diameter by the method of the invention may be effected by carrying out a series of calibration operations using suspensions of different known mean particle diameter, and then matching the intensity value obtained from the test suspension against the calibration results. In some cases, it will be found that the scattered radiation intensity is approximately proportional to the square of the mean particle diameter.

When a measurement is carried out on a suspension of particles having a range of diameters, the measured intensity provides a measure of a weighted mean particle diameter.

Referring to FIG. 2 of the accompanying drawings, a collimated beam of light illuminates the upper surface 2 of an aqueous suspension 3 at almost grazing incidence. The suspension 3 is separated from a particle-free water layer 4 by a transparent membrane (not shown). The light passes through the same optical medium (water) both in the particle-free layer 4 and in the suspension 3, and there is therefore no reflection at the interface. The illuminating radiation 1 enters the particle-free layer 4 through a smooth surface defined by an inclined transparent wall 10 of a vessel 11. The wall 10 is substantially perpendicular to the beam 1, so that no refraction occurs as the beam passes through the wall.

A component 5 of the scattered light passes by way of a direction-selecting optical arrangement, which comprises a slit stop 6, a lens 7, and a further stop 9, onto a photo-sensitive detector 8. The measured intensity of the light scattered at the small scattering angle $2\alpha$ provides a measure of a weighted mean size of the particles in suspension. The direction-selecting arrangement is located symmetrically with respect to the incident beam 1, so that the complement ($\alpha$) of the angle of incidence, is equal to one half of the scattering angle ($2\alpha$).

Information as to the particle size distribution in the suspension can be obtained either by making measurements at different wavelengths for a given scattering angle $2\alpha$, or by varying the scattering angle within certain limits for a fixed wavelength.

We claim:

1. A method for measuring, and/or detecting changes in, the diameter of particles in suspension in a fluid medium, which comprises causing a beam of radiation to enter the upper surface of the suspension at a large angle of incidence through a particle-free layer located directly above the suspension and comprising a material having substantially the same refractive index as the suspending medium, and measuring the intensity of radiation that is scattered by the suspended particles and re-enters the layer for at least one small scattering angle.

2. A method according to claim 1, wherein the incident beam consists of polychromatic radiation and the intensity of the scattered radiation is measured for each of a series of wavelengths at a single small forward scattering angle.

3. A method according to claim 1, wherein the wavelength of the incident radiation is so selected that the ratio of the particle radius to the wavelength of the radiation in the suspending medium is in the range of from 0.3:1 to 5:1.

4. A method according to claim 3, wherein the said ratio is in the range of from 1:1 to 5:1.

5. A method according to claim 1, wherein the beam of radiation enters the upper surface of the suspension at an angle of incidence of at least 65°.

6. A method according to claim 5, wherein the said angle of incidence is at least 80°.

7. A method according to claim 1, wherein the illuminating beam enters the particle-free layer through a surface thereof that is not parallel to the upper surface of the suspension, and that is substantially perpendicular to said beam.

* * * * *